US009519652B2

(12) United States Patent
Su et al.

(10) Patent No.: US 9,519,652 B2
(45) Date of Patent: Dec. 13, 2016

(54) METHOD, APPARATUS, AND SYSTEM FOR OPERATING SHARED RESOURCE IN ASYNCHRONOUS MULTIPROCESSING SYSTEM

(71) Applicant: Huawei Technologies Co., Ltd., Shenzhen (CN)

(72) Inventors: Qing Su, Shanghai (CN); Yu Liu, Shanghai (CN); Xiancheng Guo, Shanghai (CN); Hu Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 391 days.

(21) Appl. No.: 13/870,586

(22) Filed: Apr. 25, 2013

(65) Prior Publication Data
US 2013/0290286 A1    Oct. 31, 2013

(30) Foreign Application Priority Data

Apr. 27, 2012    (CN) .......................... 2012 1 0128622

(51) Int. Cl.
*G06F 17/30*    (2006.01)
*G06F 13/16*    (2006.01)
(52) U.S. Cl.
CPC ..... *G06F 17/30171* (2013.01); *G06F 13/1663* (2013.01)
(58) Field of Classification Search
CPC ............................................... G06F 17/30171
USPC .................................. 707/704, 687
See application file for complete search history.

(56) References Cited

U.S. PATENT DOCUMENTS

| 4,574,350 A | * | 3/1986 | Starr .......................... G06F 9/52 710/200 |
| 4,665,484 A | * | 5/1987 | Nanba ....................... G06F 9/52 711/153 |
| 4,709,326 A | * | 11/1987 | Robinson ................. G06F 9/52 710/200 |
| 5,226,143 A | * | 7/1993 | Baird et al. ................... 711/145 |

(Continued)

FOREIGN PATENT DOCUMENTS

CN         1537275 A      10/2004
CN       101078996 A      11/2007
(Continued)

*Primary Examiner* — Miranda Le
(74) *Attorney, Agent, or Firm* — Brinks Gilson & Lione (57) ABSTRACT

Technical effects of a method, an apparatus, and a system for operating a shared resource in an asynchronous multiprocessing system that are provided in the present invention are as follows: A processor in an asynchronous multiprocessing system implements an operation on a shared resource by locking a hardware resource lock, and the hardware resource lock is implemented by a register; in this way, a bus in the asynchronous multiprocessing system does not need to support a synchronization operation, and the processor also does not need to have a feature of supporting a synchronization operation, and is capable of implementing the operation on the shared resource only in a manner of accessing the register, which simplifies the operation on the shared resource by the processor in the asynchronous multiprocessing system, enlarges a selection range of the processor in the asynchronous multiprocessing system, and further improves flexibility of the asynchronous multiprocessing system.

17 Claims, 4 Drawing Sheets

(56) References Cited

U.S. PATENT DOCUMENTS

| | | | | |
|---|---|---|---|---|
| 5,263,146 A | * | 11/1993 | Mishima | 711/163 |
| 5,448,732 A | * | 9/1995 | Matsumoto | 718/104 |
| 5,669,002 A | * | 9/1997 | Buch | G06F 9/52 709/213 |
| 6,105,085 A | * | 8/2000 | Farley | G06F 9/52 709/229 |
| 6,154,819 A | * | 11/2000 | Larsen | G11C 16/22 365/185.33 |
| 6,446,179 B2 | * | 9/2002 | Baltar | G06F 12/1433 365/185.11 |
| 6,523,033 B1 | * | 2/2003 | Holt | G06F 17/30171 |
| 6,957,315 B2 | * | 10/2005 | Chauvel | G06F 1/206 711/156 |
| 6,973,521 B1 | * | 12/2005 | Indiresan et al. | 710/200 |
| 7,143,414 B2 | * | 11/2006 | Heddes | G06F 9/52 710/200 |
| 7,155,540 B2 | * | 12/2006 | Nakamura | G06F 15/167 709/213 |
| 7,409,506 B2 | * | 8/2008 | Kamigata | G06F 9/526 710/260 |
| 7,487,153 B2 | * | 2/2009 | Makhervaks | G06F 9/526 |
| 7,571,270 B1 | * | 8/2009 | Nemirovsky | G06F 13/364 710/200 |
| 7,765,547 B2 | * | 7/2010 | Cismas | G06F 9/3851 712/214 |
| 8,055,856 B2 | * | 11/2011 | Coon | G06F 9/526 711/147 |
| 8,321,872 B2 | * | 11/2012 | Terrell, II | G06F 9/526 710/200 |
| 8,555,284 B2 | * | 10/2013 | Cazorla Almeida | 718/102 |
| 8,726,279 B2 | * | 5/2014 | Avkarogullari et al. | 718/100 |
| 8,949,539 B2 | * | 2/2015 | Blumrich | G06F 15/17381 711/122 |
| 2002/0121555 A1 | | 9/2002 | Cipolla et al. | |
| 2006/0230207 A1 | * | 10/2006 | Finkler | 710/240 |
| 2006/0288244 A1 | * | 12/2006 | Cai et al. | 713/300 |
| 2007/0261053 A1 | | 11/2007 | Avkarogullari et al. | |
| 2007/0283128 A1 | * | 12/2007 | Hoshaku | 712/1 |
| 2008/0005740 A1 | * | 1/2008 | Terrell | 718/102 |
| 2008/0270723 A1 | * | 10/2008 | Ueda | G06F 9/526 711/163 |
| 2009/0144519 A1 | * | 6/2009 | Codrescu | G06F 9/526 711/207 |
| 2010/0306432 A1 | * | 12/2010 | Juarez et al. | 710/200 |
| 2012/0117075 A1 | * | 5/2012 | Gokulakannan | 707/741 |
| 2013/0111168 A1 | * | 5/2013 | Circello | G06F 9/526 711/163 |

FOREIGN PATENT DOCUMENTS

| | | |
|---|---|---|
| CN | 101216781 A | 7/2008 |
| WO | WO 2006/057208 A1 | 1/2006 |

* cited by examiner

| 3 | 2 | 1 | 0 |
|---|---|---|---|
| Master identifier (master ID) for locking a hardware resource lock ||| Locked |

| 3 | 2 | 1 | 0 |
|---|---|---|---|
| Master identifier (master ID) for unlocking the hardware resource lock ||| Unlocked |

| 3 | 2 | 1 | 0 |
|---|---|---|---|
| Master identifier (master ID) of a lock state of the hardware resource lock ||| State |

METHOD, APPARATUS, AND SYSTEM FOR OPERATING SHARED RESOURCE IN ASYNCHRONOUS MULTIPROCESSING SYSTEM

CROSS-REFERENCE TO RELATED APPLICATION

This application claims priority to Chinese Patent Application No. 201210128622.3, filed on Apr. 27, 2012, which is hereby incorporated by reference in its entirety.

TECHNICAL FIELD

The present invention relates to computer technologies, and in particular to a method, an apparatus, and a system for operating a shared resource in an asynchronous multiprocessing system.

BACKGROUND

Systems on chip (System On Chip, SoC), such as a single-core operating system (Operating System, OS) with multiple processes, a symmetric multiprocessing (Symmetric Multiprocessing, SMP) system, and an asymmetric multiprocessing (Asymmetric Multiprocessing, AMP) system, all relate to access to a shared resource.

For the single-core OS system, resource synchronization and sharing are generally implemented by a semaphore provided by the operating system. The semaphore may be implemented by software without support of hardware. In the single-core OS system, when the multiple processes access a shared resource, a semaphore needs to be acquired first. The semaphore is generally implemented by a data structure (that is, in a software data structure manner) provided by the operating system. The processes obtain execution time of a processor according to a time slice. Therefore, access of the processor to the semaphore is unique at any time, and a problem of bus contention does not occur.

In a multiprocessing system, execution by each processor is completely independent. Therefore, each processor may perform an operation of independent access to a resource at any time. In this case, bus contention exists. A problem of bus contention in semaphore access cannot be solved in a software manner. Therefore, resource synchronization and sharing need support of hardware. For example, an ARM is generally implemented by an exclusive operation of an AMBA bus. Two conditions need to be met for implementing resource synchronization and sharing in the multiprocessing system: support of hardware and that a processor is capable of initiating a synchronization operation.

However, when the multiprocessing system accesses a shared resource, a bus needs to support a synchronization operation and a processor needs to support a synchronous access operation, which not only increases difficulty of logic, but also imposes a limitation on selection of the processor and reduces flexibility.

In a practical SoC design, it is often encountered that conditions for resource synchronization and sharing fail to be met. If there is a control processor, such as ARM7, Cortex M3, and MCU, in a system, the processor is used for system control or low power consumption control, and the control processor cannot initiate a synchronization operation. In addition, the control processor and a main processor may access a same resource. In this case, a resource synchronization problem exists. This type of processor is generally not mounted on a same bus as the main processor. Therefore, it is difficult to implement resource synchronization and sharing by using unified bus support.

SUMMARY

Embodiments of the present invention provide a method, an apparatus, and a system for operating a shared resource in an asynchronous multiprocessing system, which are used to simplify an operation on the shared resource in the asynchronous multiprocessing system.

In a first aspect, an embodiment of the present invention provides a method for operating a shared resource in an asynchronous multiprocessing system, where the method includes:

receiving, by a hardware resource lock, a lock command sent by a first processor in the asynchronous multiprocessing system, where the hardware resource lock is implemented by a register; and ignoring, by the hardware resource lock when being in a locked state, the lock command, and setting, by the hardware resource lock when being in an unlocked state, its state to a state of being locked by the first processor, so that the first processor operates the shared resource.

In a second aspect, an embodiment of the present invention provides a method for operating a shared resource in an asynchronous multiprocessing system, where the method includes:

delivering, by a first processor in the asynchronous multiprocessing system, a lock command to a hardware resource lock when the hardware resource lock is in an unlocked state, so as to lock the hardware resource lock, where the hardware resource lock is implemented by a register; and operating, by the first processor, the shared resource when the hardware resource lock is in a state of being locked by the first processor.

In a third aspect, an embodiment of the present invention provides a hardware resource lock, including:

a lock state register, configured to provide a state of the hardware resource lock; and a lock register, configured to receive a lock command sent by a first processor in an asynchronous multiprocessing system, ignore the lock command when the hardware resource lock is in a locked state, and set, when the hardware resource lock is in an unlocked state, the state of the hardware resource lock to a state of being locked by the first processor, so that the first processor operates a shared resource.

In a fourth aspect, an embodiment of the present invention provides a processor in an asynchronous multiprocessing system, where the processor includes:

a lock unit, configured to deliver a lock command to a hardware resource lock when the hardware resource lock is in an unlocked state, so as to lock the hardware resource lock, where the hardware resource lock is implemented by a register; and a resource operating unit, configured to operate a shared resource when the hardware resource lock is in a state of being locked by the processor.

In a fifth aspect, an embodiment of the present invention provides an asynchronous multiprocessing system, including the foregoing hardware resource lock and at least two foregoing processors in the asynchronous multiprocessing system.

Technical effects of the method, apparatus, and system for operating a shared resource in an asynchronous multiprocessing system that are provided in the embodiments of the present invention are as follows: A processor in an asynchronous multiprocessing system implements an operation on a shared resource by locking a hardware resource lock, and the hardware resource lock is implemented by a register; in this way, a bus in the asynchronous multiprocessing system does not need to support a synchronization operation, and the processor also does not need to have a feature of supporting a synchronization operation, and is capable of implementing the operation on the shared resource only in a manner of accessing the register, which simplifies the operation on the shared resource by the processor in the asynchronous multiprocessing system, enlarges a selection range of the processor in the asynchronous multiprocessing system, and further improves flexibility of the asynchronous multiprocessing system.

DESCRIPTION OF EMBODIMENTS

Figure 1:
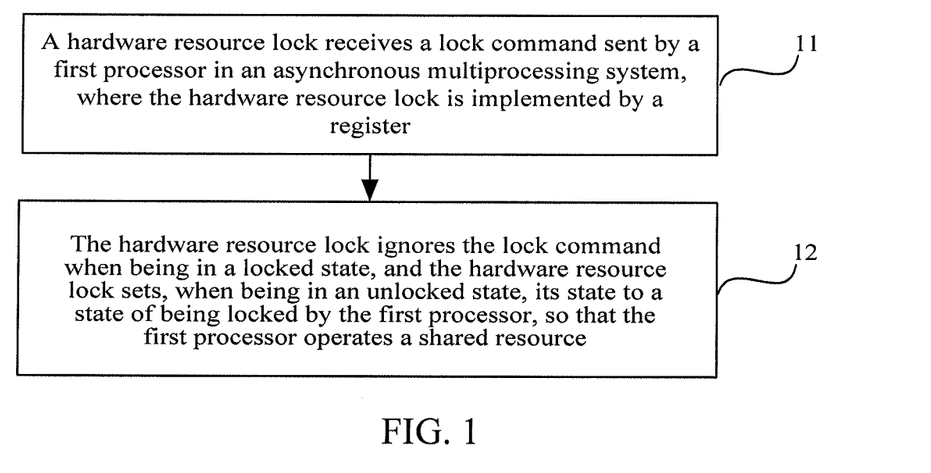
FIG. 1 is a flowchart of a method for operating a shared resource in an asynchronous multiprocessing system according to an embodiment of the present invention.

FIG. 1 is a flowchart of a method for operating a shared resource in an asynchronous multiprocessing system according to an embodiment of the present invention. As shown in FIG. 1, this method includes:

Step 11: A hardware resource lock receives a lock command sent by a first processor in the asynchronous multiprocessing system, where the hardware resource lock is implemented by a register.

Step 12: When being in a locked state, the hardware resource lock ignores the lock command, and when being in an unlocked state, the hardware resource lock sets its state to a state of being locked by the first processor, so that the first processor operates the shared resource.

Alternatively, before the receiving, by the hardware resource lock, the lock command sent by the first processor on the asynchronous multiprocessing system, the method further includes:

receiving a first query command sent by the first processor, where the first query command is used to query a state of the hardware resource lock; and returning the state of the hardware resource lock to the first processor.

Alternatively, after the ignoring, by the hardware resource lock when being in the locked state, the lock command, and setting, by the hardware resource lock when being in the unlocked state, its state to the state of being locked by the first processor, so that the first processor operates the shared resource, the method further includes:

receiving a second query command sent by the first processor, where the second query command is used to query whether the hardware resource lock is locked by the first processor; and returning a lock result to the first processor.

Alternatively, after the setting, by the hardware resource lock when being in the unlocked state, its state to the state of being locked by the first processor, so that the first processor operates the shared resource, the method further includes:

receiving an unlock command sent by the first processor; and restoring, by the hardware resource lock, its state to the unlocked state according to the unlock command.

Alternatively, after the receiving, by the hardware resource lock, the lock command sent by the first processor in the asynchronous multiprocessing system, the method further includes:

receiving a lock command sent by a second processor in the asynchronous multiprocessing system; and ignoring, by the hardware resource lock, the lock command sent by the second processor.

Alternatively, before the receiving the lock command sent by the second processor in the asynchronous multiprocessing system, the method further includes:

receiving a first query command sent by the second processor, where the first query command sent by the second processor is used to query a state of the hardware resource lock; and returning the state of the hardware resource lock to the second processor.

Alternatively, after the ignoring, by the hardware resource lock, the lock command sent by the second processor, the method further includes:

receiving a second query command sent by the second processor, where the second query command sent by the second processor is used to query whether the hardware resource lock is locked by the second processor; and returning a lock result to the second processor.

In this embodiment of the present invention, an asynchronous multiprocessing system implements an operation on a shared resource by locking a hardware resource lock, and the hardware resource lock is implemented by a register; in this way, a bus in the asynchronous multiprocessing system does not need to support a synchronization operation, and a processor also does not need to have a feature of supporting a synchronization operation, and is capable of implementing the operation on the shared resource only in a manner of accessing the register, which simplifies the operation on the shared resource by the processor in the asynchronous multiprocessing system, enlarges a selection range of the processor in the asynchronous multiprocessing system, and further improves flexibility of the asynchronous multiprocessing system.

Figure 2:
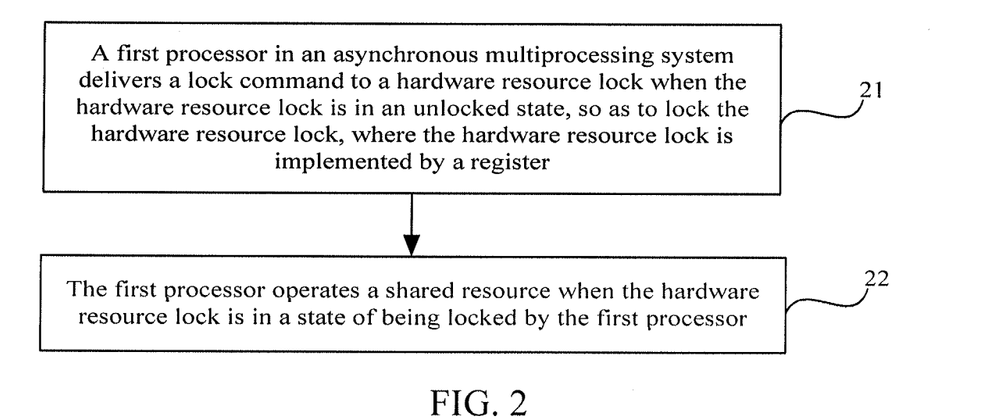
FIG. 2 is a flowchart of another method for operating a shared resource in an asynchronous multiprocessing system according to an embodiment of the present invention.

FIG. 2 is a flowchart of another method for operating a shared resource in an asynchronous multiprocessing system according to an embodiment of the present invention. As shown in FIG. 2, this method includes:

Step 21: A first processor in the asynchronous multiprocessing system delivers a lock command to a hardware resource lock when the hardware resource lock is in an unlocked state, so as to lock the hardware resource lock, where the hardware resource lock is implemented by a register.

Step 22: The first processor operates the shared resource when the hardware resource lock is in a state of being locked by the first processor.

Alternatively, before the operating, by the first processor, the shared resource, the method further includes:

reading, by the first processor, a state of the hardware resource lock.

Alternatively, after the operating, by the first processor, the shared resource, the method further includes:

sending, by the first processor, an unlock command to the hardware resource lock, so that the hardware resource lock restores its state to the unlocked state.

In this embodiment of the present invention, a processor in an asynchronous multiprocessing system implements an operation on a shared resource by locking a hardware resource lock, and the hardware resource lock is implemented by a register; in this way, a bus in the asynchronous multiprocessing system does not need to support a synchronization operation, and the processor also does not need to have a feature of supporting a synchronization operation, and is capable of implementing the operation on the shared resource only in a manner of accessing the register, which simplifies the operation on the shared resource by the processor in the asynchronous multiprocessing system, enlarges a selection range of the processor in the asynchronous multiprocessing system, and further improves flexibility of the asynchronous multiprocessing system.

Persons of ordinary skill in the art may understand that all or part of the steps of the foregoing method embodiments may be implemented by a program instructing relevant hardware. The program may be stored in a computer readable storage medium. When the program is run, the steps of the foregoing method embodiments are performed. The storage medium includes any medium that is capable of storing program codes, such as a ROM, a RAM, a magnetic disk, or an optical disk.

Figure 3:
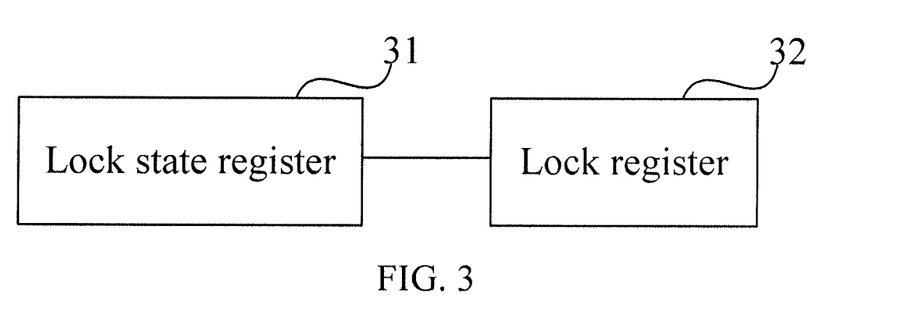
FIG. 3 is a schematic structural diagram of a hardware resource lock according to an embodiment of the present invention.

FIG. 3 is a schematic structural diagram of a hardware resource lock according to an embodiment of the present invention. As shown in FIG. 3, the hardware resource lock includes: a lock state register 31 and a lock register 32.

The lock state register 31 is configured to provide a state of the hardware resource lock; and the lock register 32 is configured to receive a lock command sent by a first processor in an asynchronous multiprocessing system, ignore the lock command when the hardware resource lock is in a locked state, and set, when the hardware resource lock is in an unlocked state, the state of the hardware resource lock to a state of being locked by the first processor, so that the first processor operates a shared resource.

Alternatively, the lock state register 31 is further configured to receive a first query command sent by the first processor, where the first query command is used to query a state of the hardware resource lock, and return the state of the hardware resource lock to the first processor.

Alternatively, the lock register 32 is further configured to receive a second query command sent by the first processor, where the second query command is used to query whether the hardware resource lock is locked by the first processor, and return a lock result to the first processor.

Alternatively, the hardware resource lock further includes: an unlock register, configured to set, when the hardware resource lock is in an unlocked state, the state of the hardware resource lock to a state of being locked by the first processor, so that after the first processor operates the shared resource, the hardware resource lock receives an unlock command sent by the first processor and restores its state to the unlocked state according to the unlock command.

Alternatively, the lock register 32 is further configured to, after receiving the lock command sent by the first processor in the asynchronous multiprocessing system, receive a lock command sent by a second processor in the asynchronous multiprocessing system, and ignore the lock command sent by the second processor.

Alternatively, the lock state register is further configured to, before the lock register 32 receives the lock command sent by the second processor in the asynchronous multiprocessing system, receive a first query command sent by the second processor, where the first query command sent by the second processor is used to query a state of the hardware resource lock, and return the state of the hardware resource lock to the second processor.

Alternatively, the lock state register 31 is further configured to, after the lock register ignores the lock command sent by the second processor, receive a second query command sent by the second processor, where the second query command sent by the second processor is used to query whether the hardware resource lock is locked by the second processor, and return a lock result to the second processor.

In this embodiment of the present invention, a hardware resource lock uses a lock register and a lock state register to enable a processor of a signal in an asynchronous multiprocessing system to implement an operation on a shared resource by locking the hardware resource lock, and the hardware resource lock is implemented by a register; in this way, a bus in the asynchronous multiprocessing system does not need to support a synchronization operation, and the processor also does not need to have a feature of supporting a synchronization operation, and is capable of implementing the operation on the shared resource only in a manner of accessing the register, which simplifies the operation on the shared resource by the processor in the asynchronous multiprocessing system, enlarges a selection range of the processor in the asynchronous multiprocessing system, and further improves flexibility of the asynchronous multiprocessing system.

Figure 4:
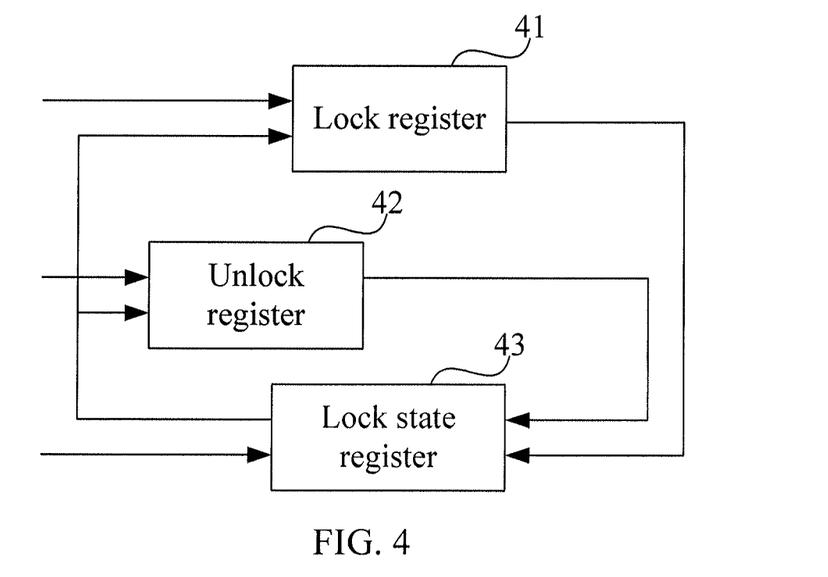
FIG. 4 is a schematic structural diagram of another hardware resource lock according to an embodiment of the present invention.
Figure 5:
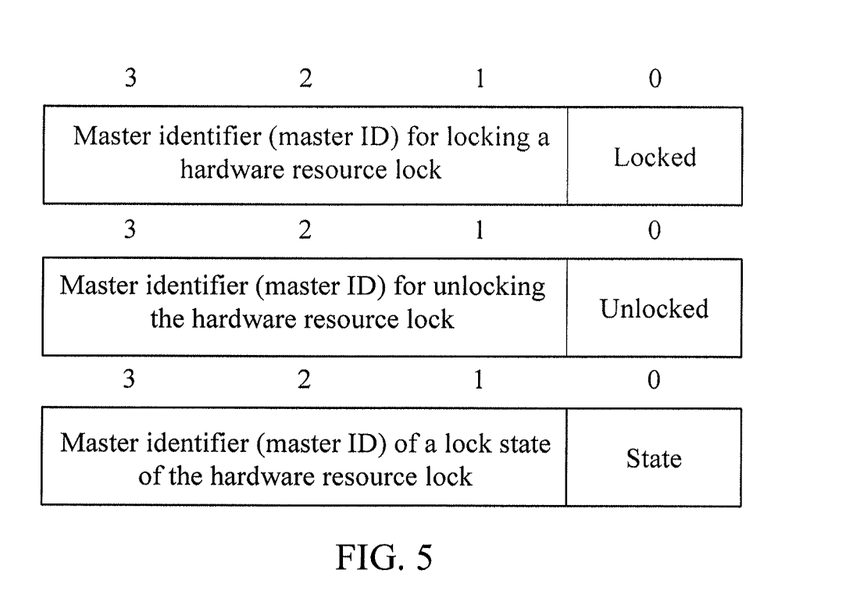
FIG. 5 is storage content information of each register in the hardware resource lock shown in FIG. 4.

FIG. 4 is a schematic structural diagram of another hardware resource lock according to an embodiment of the present invention. As shown in FIG. 4, the hardware resource lock includes three registers, namely, a lock register 41, an unlock register 42, and a lock state register 43. Storage capacity of each of the registers is 4 bits. As shown in FIG. 5, the lowest bits of the lock register 41, the unlock register 42, and the lock state register 43 are a lock command bit, an unlock command bit, and a lock state flag bit, respectively; and three high bits indicate a corresponding master identifier (master ID), that is, an identifier of a processor that locks or unlocks the hardware resource lock.

Figure 6:
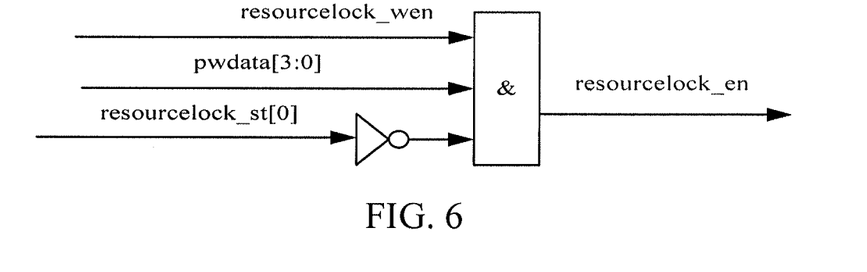
FIG. 6 is a logic implementation diagram of a lock register in the hardware resource lock shown in FIG. 4.

That a write operation is performed on a shared resource is taken as an example. Logic implementation of the lock register 41 is shown in FIG. 6, where each signal is described as follows:

resourcelock_wen: indicates a signal for enabling a write operation in locking, where the signal is sent by a processor in an asynchronous multiprocessing system, that is, a command of writing in locking;

pwdata[3:0]: indicates a data signal written in locking, where the signal is sent by a processor in an asynchronous multiprocessing system, where pwdata[0] indicates a lock command sent by the processor, and pwdata[3:1] indicates an identifier of the processor that sends the lock command;

resourcelock_st[0]: indicates a signal about a state of a hardware resource lock, where the signal is provided by the lock state register 43; and resourcelock_en: indicates a lock enabling signal sent by the lock register 41.

Assume that when the lock register 41 receives a command of writing in locking and a lock command that are sent by a first processor in an asynchronous multiprocessing system, if resourcelock_st[0] indicates an unlocked state, the lock register 41 sends a lock enabling signal to the lock state register 43, and if resourcelock_st[0] indicates a locked state, the lock register 41 does not send a lock enabling signal.

Figure 7:
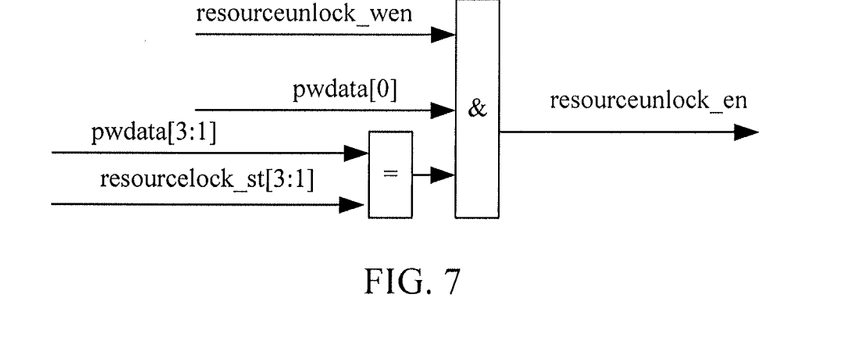
FIG. 7 is an implementation logic diagram of an unlock register in the hardware resource lock shown in FIG. 4.

Logic implementation of the unlock register 42 is shown in FIG. 7, where each signal is described as follows:

resourceunlock_wen: indicates a signal for enabling a write operation in unlocking, where the signal is sent by a processor in an asynchronous multiprocessing system, that is, a command of writing in unlocking;

pwdata[0]: indicates an unlock command sent by a processor in an asynchronous multiprocessing system;

pwdata[3:1]: indicates an identifier of the processor that sends the unlock command;

resourcelock_st[3:1]: indicates an identifier of a processor that locks a hardware resource lock, where the identifier is provided by the lock state register 43; and resourceunlock_en: indicates an unlock enabling signal sent by the unlock register 42.

The unlock register 42 does not need to know a state of a hardware resource lock. If the unlock register 42 receives an unlock command sent by a processor in an asynchronous multiprocessing system, the hardware resource lock is definitely in a locked state, that is, a state provided by the lock state register 43 is definitely the locked state. In this case, the unlock register 42 only needs to determine whether the identifier of the processor that sends the unlock command is consistent with the identifier of the processor that sends the lock command. Therefore, the lock state register 43 needs to provide resourcelock_st[3:1] for the unlock register 42, and provide resourcelock_st[0] for the lock register 41.

Figure 8:
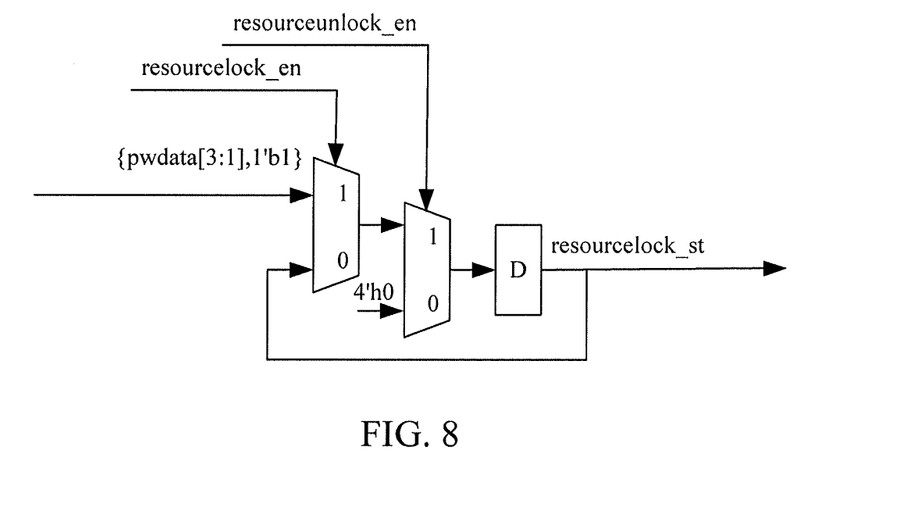
FIG. 8 is an implementation logic diagram of a lock state register in the hardware resource lock shown in FIG. 4.

Logic implementation of the lock state register 43 is shown in FIG. 8, where each signal is described as follows:

resourceunlock_en: indicates an unlock enabling signal sent by the unlock register 42;

resourcelock_en: indicates a lock enabling signal sent by the lock register 41:

pwdata[3:1]: indicates an identifier of a processor that sends a lock command, where the identifier is sent by a processor in an asynchronous multiprocessing system; and resourcelock_st[3:0]: indicates a signal about a state of a resource lock, where the signal is provided by the lock state register 43.

When the lock state register 43 receives a lock enabling signal, resourcelock_st[3:1] in resourcelock_st[3:0] indicates an identifier of a processor that locks the hardware resource lock, and resourcelock_st[0] indicates that the hardware resource lock is in a locked state. When the lock state register 43 receives an unlock enabling signal, resourcelock_st[3:1] in resourcelock_st[3:0] is invalid, and resourcelock_st[0] indicates that the hardware resource lock is in an unlocked state.

When the hardware resource lock is in an unlocked state, a processor in the asynchronous multiprocessing system is allowed to deliver a lock command to lock the hardware resource lock; otherwise, a delivered lock command is invalid.

When the hardware resource lock is in a locked state, it is allowed to deliver an unlock command to unlock the resource lock. During the unlocking, the identifier of the processor that sends the unlock command needs to be consistent with the identifier of the processor that locks the hardware resource lock; otherwise, the unlocking is invalid. A locking process of the hardware resource lock has a mutually exclusive feature. When two processors initiate lock commands to a resource lock at the same time, a lock command received by the resource lock first is accepted, and a lock command received later is ignored. Therefore, after a process of a certain processor initiates a lock command, a lock state needs to be read back to confirm whether the process locks the resource lock.

Figure 9:
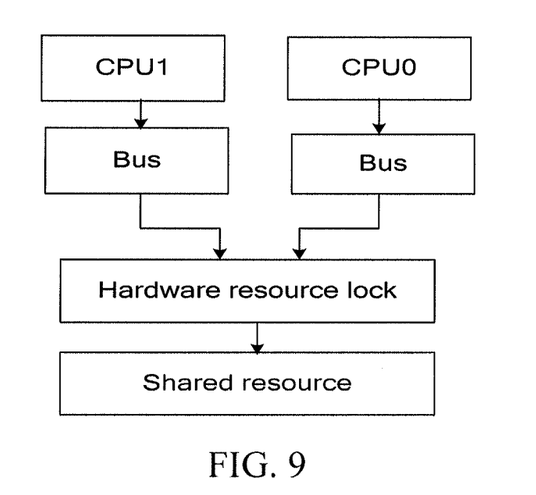
FIG. 9 is a schematic structural diagram of an asynchronous multiprocessing system according to an embodiment of the present invention.

Take two processors, a CPU0 and a CPU1, shown in FIG. 9 as examples for further detailed description.

First, the CPU0 and the CPU1 separately query a lock state of the hardware resource lock. If the hardware resource lock is in an unlocked state, the CPU0 sends a lock command with an ID 000 (a value written into the lock register is 4'b0001), and the CPU1 sends a lock command with an ID 001 (a value written into the lock register is 4'b0011).

After the lock commands sent by the CPU0 and the CPU1 pass through a bus, the lock command sent by the CPU1 arrives at an interface of the hardware resource lock first. The lock register sends a lock enabling signal to trigger the lock state register to set a lock state field to 1 and a lock master ID to 001. That is, resourcelock_st[3:0] sent by the lock state register is 4'b0011.

The lock command sent by the CPU0 arrives at the interface of the hardware resource lock later. Therefore, the lock register in the hardware resource lock determines that the hardware resource lock has been locked and therefore ignores the lock command sent by the CPU0.

After the hardware resource lock is locked, only an unlock command sent by the processor that locks the hardware resource lock is accepted and all other commands or operations are ignored.

After sending the lock commands, both the CPU0 and the CPU1 send operation query commands to query whether the locking is performed by the processor itself. For example, the identifier of the processor that locks the hardware resource lock may be learned by reading the lock state register, so that whether the processor itself successfully performs the locking may be learned.

In this embodiment, the CPU0 finds, through querying, that the locking fails, while the CPU1 finds, through querying, that the locking succeeds. The CPU0 continues to query the lock state of the hardware resource lock. The CPU0 may send a lock command to lock the hardware resource lock only after the CPU1 initiates an unlock operation, thereby operating the shared resource by using the hardware resource lock.

After learning that the locking succeeds, the CPU1 completes the operation on the shared resource by using the hardware resource lock. Then, the CPU1 sends an unlock command pwdata[3:0]. For example, the CPU1 writes 4'b0011 into the unlock register. After receiving the unlock command, the hardware resource lock first determines whether the operation is initiated by the processor whose ID is 001. If yes, an unlock enabling signal is sent to trigger the lock state register to set the locked state of the hardware resource lock to the unlocked state, and set the master ID field to 0 at the same time.

After finding, through querying, that the hardware resource lock is in an unlocked state, the CPU0 sends a lock command to lock the hardware resource lock. After the locking succeeds, the CPU0 operates the shared resource by using the hardware resource lock.

Figure 10:
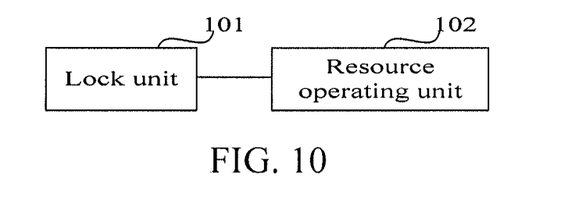
FIG. 10 is a schematic structural diagram of a processor in an asynchronous multiprocessing system according to an embodiment of the present invention.

FIG. 10 is a schematic structural diagram of a processor in an asynchronous multiprocessing system according to an embodiment of the present invention. As shown in FIG. 10, the processor in the asynchronous multiprocessing system includes: a lock unit 101 and a resource operating unit 102.

The lock unit 101 is configured to deliver a lock command to a hardware resource lock when the hardware resource lock is in an unlocked state, so as to lock the hardware resource lock, where the hardware resource lock is implemented by a register. The resource operating unit 102 is configured to operate a shared resource when the hardware resource lock is in a state of being locked by the processor.

Alternatively, the processor in the asynchronous multiprocessing system provided in this embodiment of the present invention further includes: a lock readback unit, configured to read a state of the hardware resource lock before the resource operating unit 102 operates the shared resource.

Alternatively, the processor in the asynchronous multiprocessing system provided in this embodiment of the present invention further includes: an unlock unit, configured to send an unlock command to the hardware resource lock after the resource operating unit 102 operates the shared resource, so that the hardware resource lock restores its state to the unlocked state.

In this embodiment of the present invention, a lock unit locks a hardware resource lock to enable a processor of a signal in an asynchronous multiprocessing system to implement an operation on a shared resource, and the hardware resource lock is implemented by a register; in this way, a bus in the asynchronous multiprocessing system does not need to support a synchronization operation, and the processor also does not need to have a feature of supporting a synchronization operation, and is capable of implementing the operation on the shared resource only in a manner of accessing the register, which simplifies the operation on the shared resource by the processor in the asynchronous multiprocessing system, enlarges a selection range of the processor in the asynchronous multiprocessing system, and further improves flexibility of the asynchronous multiprocessing system.

An asynchronous multiprocessing system provided in an embodiment of the present invention includes a processor and a hardware resource lock. There are at least two processors, which may be any type of the processors in the asynchronous multiprocessing system provided in the foregoing embodiments. The hardware resource lock may be any hardware resource lock provided in the foregoing embodiments.

Figure 11:
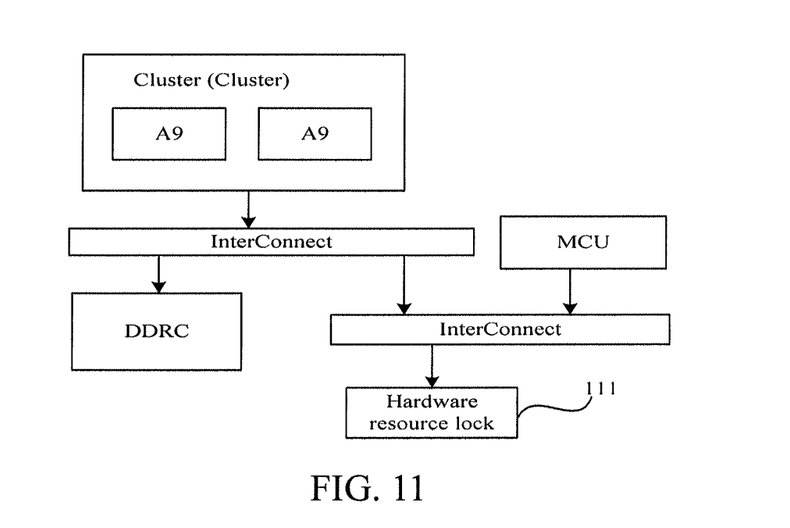
FIG. 11 is a schematic structural diagram of another asynchronous multiprocessing system according to an embodiment of the present invention.

An example of the asynchronous multiprocessing system provided in this embodiment of the present invention is shown in FIG. 9. Another example is shown in FIG. 11. An A9 cluster (A9 Cluster) and an MCU being processors and InterConnect being a bus form an asynchronous multiprocessing system with a hardware resource lock 111. In the asynchronous multiprocessing system, the A9 Cluster processor and the MCU may access a shared resource through the hardware resource lock 111.

In this embodiment of the present invention, a processor of a signal in an asynchronous multiprocessing system implements an operation on a shared resource by locking a hardware resource lock, and the hardware resource lock is implemented by a register; in this way, a bus in the asynchronous multiprocessing system does not need to support a synchronization operation, and the processor also does not need to have a feature of supporting a synchronization operation, and is capable of implementing the operation on the shared resource only in a manner of accessing the register, which simplifies the operation on the shared resource by the processor in the asynchronous multiprocessing system, enlarges a selection range of the processor in the asynchronous multiprocessing system, and further improves flexibility of the asynchronous multiprocessing system.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent replacements to part or all of the technical features of the technical solutions described in the foregoing embodiments; however, these modifications or replacements do not make the essence of the corresponding technical solutions depart from the scope of the technical solutions of the embodiments of the present invention.

What is claimed is:

1. A method for operating a shared hardware resource in an asynchronous multiprocessing system, comprising:
   accessing by a first and a second processor in the asynchronous multiprocessing system, a shared hardware resource through a same hardware resource lock register, wherein the same hardware resource lock register is coupled to the first and the second processor which are separately located from the same hardware resource lock register through first and second respective buses;
   wherein the same hardware resource lock register is implemented by a plurality of register circuitry portions comprised within the same hardware resource lock register, including:
      a first register circuitry portion comprising a lock register circuitry portion,
      a second register circuitry portion comprising an unlock circuitry register portion, and
      a third register circuitry portion comprising a lock state register circuitry portion; the method comprising:
   receiving by a first input of the lock register circuitry portion, a lock command sent from the first processor in the asynchronous multiprocessing system, wherein the lock command is multiplexed with a lock state signal received at a second input of the lock register circuitry portion, wherein the received lock state signal is sent from the lock state register circuitry portion of the same hardware resource lock register to further perform one of the following:
   when the received lock state signal at the second input of the lock register circuitry portion is in an unlock state, outputting by the lock register circuitry portion, a lock enable signal to the lock state register circuitry portion to set the same hardware resource lock register to a state of being locked by the first processor, so that the first processor operates the shared resource, wherein after the setting, by the lock state register circuitry portion, the state of the same hardware resource lock register to a state of being locked by the first processor in order that the first processor operates the shared resource, the method further comprises:
receiving at a first input of the unlock register portion: an unlock command sent by the first processor to trigger an output by the unlock register portion, and a resource unlock enable command to a first input of the lock state register portion; and restoring, by the lock state register portion of the hardware resource lock, the state of the same hardware resource lock register to the unlocked state according to the received unlock command; or
ignoring by the lock register circuitry portion, the lock command at the first input when the received lock state signal at the second input of the lock register circuitry portion is in a lock state.

2. The method according to claim 1, wherein before receiving by the lock register circuitry portion of the same hardware resource lock register the first input of the lock command sent by the first processor in the asynchronous multiprocessing system, the method further comprises:
receiving at the first input of the lock register circuitry portion, a first query command sent by the first processor, wherein the first query command is used to query a state of the hardware resource lock; and
returning by the lock state register circuitry portion, the state of the hardware resource lock register to the first processor.

3. The method according to claim 1, wherein after the ignoring by the lock register circuitry portion of the lock command at the first input, or setting by the lock state register circuitry portion, the hardware resource lock register to a state of being locked by the first processor in order that the first processor operates the shared resource, the method further comprises:
receiving at the first input of the lock register circuitry portion, a second query command sent by the first processor, wherein the second query command is used to query whether the hardware resource lock is locked by the first processor; and
returning by the lock state register circuitry portion, a lock result to the first processor.

4. The method according to claim 1, wherein after receiving, at the first input by the lock register circuitry portion of the same hardware resource lock register, a lock command sent by the first processor in the asynchronous multiprocessing system, the method further comprises:
receiving at the first input of the lock register circuitry portion, another lock command sent by the second processor in the asynchronous multiprocessing system; and
ignoring, by the lock register circuitry portion of the hardware resource lock, the another lock command sent by the second processor.

5. The method according to claim 4, wherein before the receiving at the first input of the lock register circuitry portion, the another lock command sent by the second processor in the asynchronous multiprocessing system, the method further comprises:
receiving at the first input of the lock register circuitry portion, a first query command sent by the second processor, wherein the first query command sent by the second processor is used to query a state of the same hardware resource lock register; and
returning by the lock state register circuitry portion, the state of the hardware resource lock to the second processor.

6. The method according to claim 4, wherein after ignoring, by the lock register circuitry portion of the same hardware resource lock register, the another lock command sent by the second processor, the method further comprises:
receiving at the first input of the lock register portion, a second query command sent by the second processor, wherein the second query command sent by the second processor is used to query whether the same hardware resource lock register is locked by the second processor; and
returning by the lock state register circuitry portion, another lock result to the second processor.

7. A method for operating a shared hardware resource in an asynchronous multiprocessing system, comprising:
accessing by a first and a second processor in the asynchronous multiprocessing system, a shared hardware resource through a same hardware resource lock register, wherein the same hardware resource lock register is coupled to the first and the second processor which are separately located from the same hardware resource lock register through first and second respective buses;
wherein the hardware resource lock register is implemented by a plurality of register circuitry portions within the same hardware resource lock register, including:
a first register circuitry portion comprising a lock register circuitry portion,
a second register circuitry portion comprising an unlock circuitry register portion, and
a third register circuitry portion comprising a lock state register circuitry portion, the method comprising:
delivering, by the first processor in the asynchronous multiprocessing system, a lock command to a first input of the lock register circuitry portion of the same hardware resource lock register, and the lock command is multiplexed with a lock state signal received at a second input of the lock register circuitry portion, wherein the received lock state signal is sent from the lock state register circuitry portion of the same hardware resource lock register to further perform one of the following:
when the received lock state signal at the second input of the lock register circuitry portion is in an unlock state, outputting by the lock register circuitry portion, a lock enable signal to the lock state register circuitry portion to set the same hardware resource lock register to a state of being locked by the first processor, so that the first processor operates the shared resource, wherein after the operating, by the first processor, the shared resource, the method further comprises:
sending, by the first processor, an unlock command to a first input of the unlock register circuitry portion of the same hardware resource lock register in order that the lock state register circuitry portion of the same hardware resource lock register restores the state of the same hardware resource lock register to the unlocked state; or
ignoring by the lock register circuitry portion, the lock command at the first input when the received lock state signal at the second input of the lock register circuitry portion is in a lock state.

8. The method according to claim 7, wherein before the operating, by the first processor, the shared resource, the method further comprises: reading, by the first processor, a state of the hardware resource lock returned by the lock state register circuitry portion.

9. A hardware resource lock register which is implemented by a plurality of register circuitry portions comprised within the hardware resource lock register, which operate in the shared hardware resource, comprising:
a processor,
a first register circuitry portion comprising a lock register circuitry portion,
a second register circuitry portion comprising an unlock register circuitry portion, and
a third register circuitry portion comprising a lock state register circuitry portion; wherein:
the lock state register circuitry portion, configured to provide a lock state signal of the same hardware resource lock register; and
the lock register circuitry portion, configured to:
receive at a first input, a lock command sent by the first processor in the asynchronous multiprocessing system, wherein the lock command is multiplexed with a lock state signal received at a second input of the lock register circuitry portion, wherein the received lock state signal is sent from the lock state register circuitry portion of the hardware resource lock to further perform one of the following:
when the received lock state signal at the second input of the lock register circuitry portion is in an unlock state, outputting by the lock register circuitry portion, a lock enable signal to the lock state register circuitry portion to set the same hardware resource lock register to a state of being locked by the first processor, so that the first processor operates the shared resource, wherein after the operating, by the first processor, the shared resource, the method further comprises:
sending, by the first processor, an unlock command to a first input of the unlock register circuitry portion of the same hardware resource lock register in order that the lock state register circuitry portion of the same hardware resource lock register restores the state of the same hardware resource lock register to the unlocked state; or
not returning any signal by the lock register circuitry portion to the lock state register circuitry portion when the received lock state signal at the second input of the lock register circuitry portion is in a lock state, and ignore the lock command.

10. The hardware resource lock register according to claim 9, wherein the first input of the lock state register circuitry portion is further configured to receive a first query command sent by the first processor, wherein the first query command is used to query a state of the hardware resource lock, and return by the lock state register circuitry portion, the state of the same hardware resource lock register to the first processor.

11. The hardware resource lock register according to claim 9, wherein the first input of the lock state register circuitry portion is further configured to receive a second query command sent by the first processor, wherein the second query command is used to query whether the same hardware resource lock register is locked by the first processor, and return by the lock state register circuitry portion, a lock result to the first processor.

12. The hardware resource lock register according to claim 9, wherein:
the unlock register circuitry portion, configured to set, when the same hardware resource lock register is in an unlocked state, the lock state register circuitry portion of the hardware resource lock to a state of being locked by the first processor, so that after the first processor operates the shared resource, a first input of the unlock register circuitry portion of the same hardware resource lock register receives an unlock command sent by the first processor and restores the lock state register circuitry portion of the same hardware resource lock register to the unlocked state according to the received unlock command.

13. The hardware resource lock register according to claim 9, wherein the lock register circuitry portion is further configured to, after receiving the lock command sent by the first processor in the asynchronous multiprocessing system, receive at the first input of the lock register circuitry portion, another lock command sent by the second processor in the asynchronous multiprocessing system, and ignore the another lock command sent by the second processor.

14. The hardware resource lock register according to claim 13, wherein the lock state register circuitry portion is further configured to, before the lock register circuitry portion receives the another lock command sent by the second processor in the asynchronous multiprocessing system, receive at the first input of the lock register circuitry portion, a first query command sent by the second processor, wherein the first query command sent by the second processor is used to query a state of the same hardware resource lock register, and return by the lock state register circuitry portion, the state of the same hardware resource lock register to the second processor.

15. The hardware resource lock register according to claim 13, wherein the lock state register circuitry portion is further configured to, after the lock register circuitry portion ignores the lock command sent by the second processor, receive at the first input of the lock register portion, a second query command sent by the second processor, wherein the second query command sent by the second processor is used to query whether the same hardware resource lock register is locked by the second processor, and return by the lock state register circuitry portion, a lock result to the second processor.

16. A first processor in an asynchronous multiprocessing system having at least a second processor, comprising:
a lock unit circuitry portion, configured to deliver a lock command to a same hardware resource lock register when the same hardware resource lock register is in an unlocked state, such that the lock unit circuitry portion of the first processor lock the same hardware resource lock register to prevent the second processor from accessing a shared hardware resource through the same hardware resource lock register, wherein the same hardware resource lock register is coupled to the first and the second processor which are separately located from the same hardware resource lock register through first and second respective buses; wherein the hardware resource lock register is implemented by a plurality of register circuitry portions comprised within the same hardware resource lock register, including:
a first register circuitry portion comprising a lock register circuitry portion,
a second register circuitry portion comprising an unlock register circuitry portion, and
a third register circuitry portion comprising a lock state register circuitry portion: wherein the lock command is received in a first input of the lock register circuitry portion of the same hardware resource lock register, and the lock command is multiplexed with a lock state signal received at a second input of the lock register circuitry portion, wherein the received lock state signal is sent from the lock state register circuitry portion of the same hardware resource lock register to perform one of the following:

not returning any signal by the lock register circuitry portion to the lock state register circuitry portion when the received lock state signal at the second input of the lock register circuitry portion is in a lock state, or when the received lock state signal at the second input of the lock register circuitry portion is in an unlock state, outputting by the lock register circuitry portion, a lock enable signal to the lock state register circuitry portion to set the same hardware resource lock register to a state of being locked by the first processor; and a resource operating unit circuitry portion, configured to operate the shared resource when the same hardware resource lock register is in a state of being locked by the processor, wherein the unlock unit circuitry portion is configured to send an unlock command to a first input of the unlock register portion, wherein the resource operating unit circuitry portion operates the shared resource, so that the lock state register portion of the same hardware resource lock register restores the state of the same hardware resource lock register to the unlocked state.

17. The processor according to claim 16, further comprising: a lock readback unit circuitry portion, configured to read a state of the same hardware resource lock register before the resource operating unit circuitry portion operates the shared resource.

* * * * *